Sept. 17, 1957　　　J. M. JOHNSON　　　2,806,613
LIFTING APPARATUS MOUNTED ON A PORTABLE DOLLY
Filed Nov. 15, 1954　　　3 Sheets-Sheet 1

INVENTOR.
John Melvin Johnson
BY Frank J. Schraeder Jr.
Attorney

Sept. 17, 1957   J. M. JOHNSON   2,806,613
LIFTING APPARATUS MOUNTED ON A PORTABLE DOLLY
Filed Nov. 15, 1954   3 Sheets-Sheet 2
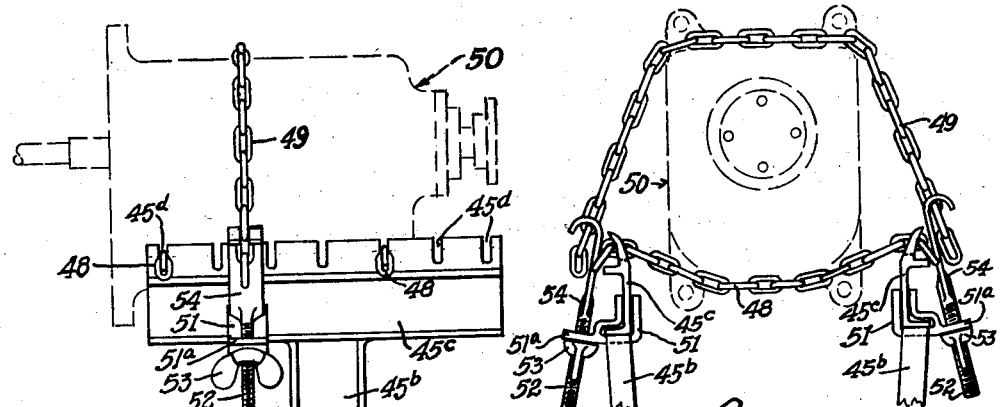
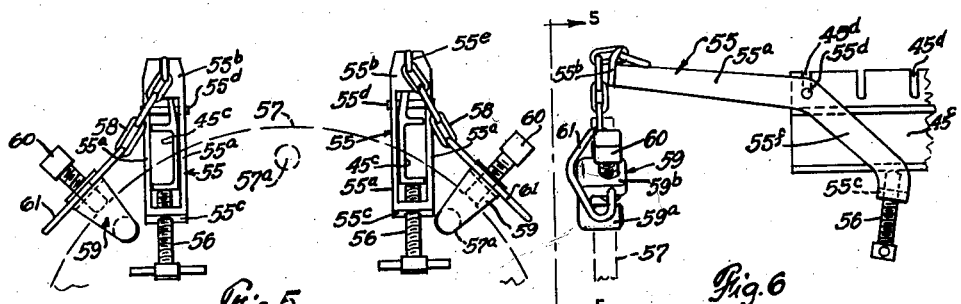
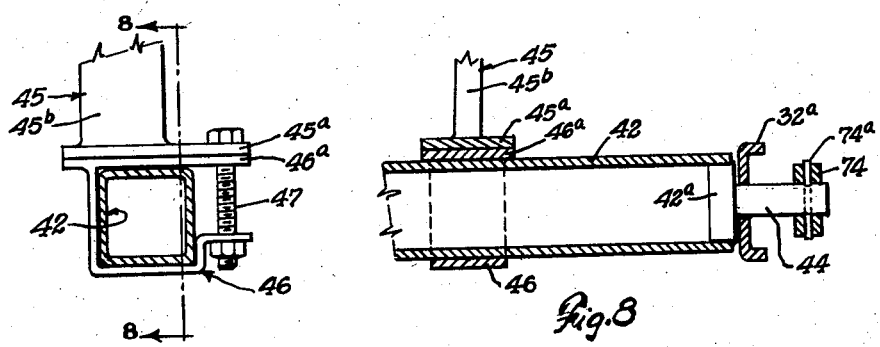
INVENTOR.
John Melvin Johnson
BY Frank J. Schraeder Jr.
Attorney Sept. 17, 1957  J. M. JOHNSON  2,806,613
LIFTING APPARATUS MOUNTED ON A PORTABLE DOLLY
Filed Nov. 15, 1954  3 Sheets-Sheet 3
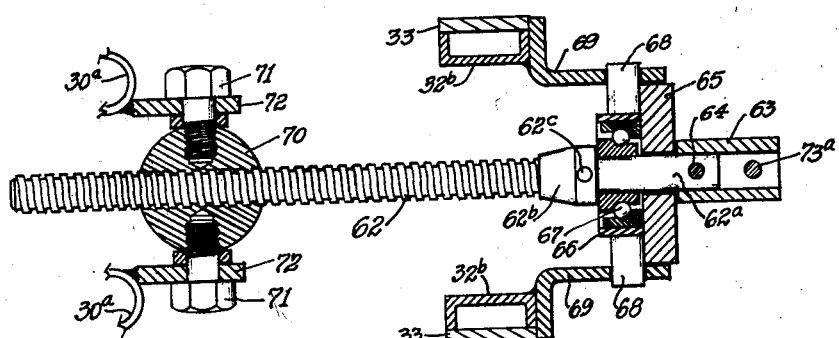
Fig. 9
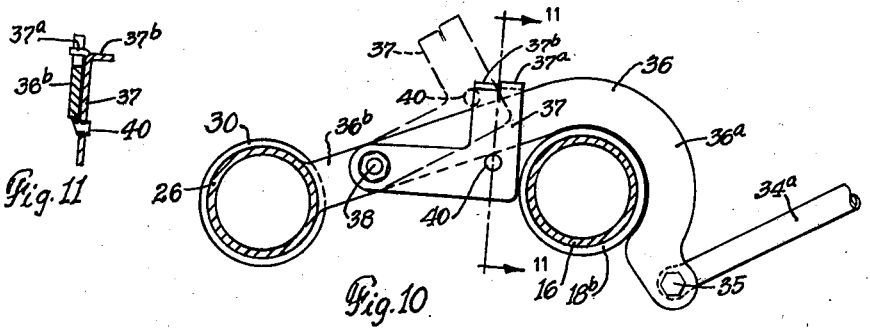
Fig. 11  Fig. 10
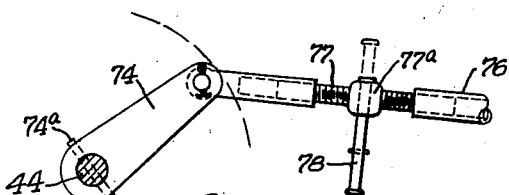
Fig. 12  Fig. 13
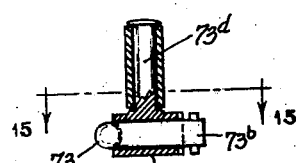
Fig. 14
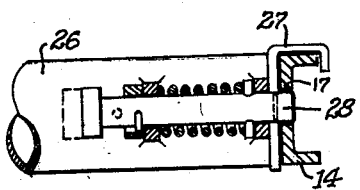
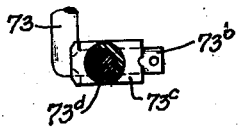
Fig. 15
INVENTOR.
John Melvin Johnson
BY Frank J. Schraeder Jr.
Attorney

United States Patent Office 2,806,613
Patented Sept. 17, 1957

2,806,613

LIFTING APPARATUS MOUNTED ON A PORTABLE DOLLY

John Melvin Johnson, Lindsborg, Kans.

Application November 15, 1954, Serial No. 468,704

14 Claims. (Cl. 214—1)

Among the objects of my invention is to provide a novel lifting apparatus of the mobile type that is particularly useful in automotive vehicle repair shops where it is especially adapted for removing and remounting of transmissions and differential units from and into the vehicles.

Another object of my invention is found in the adaption of my improved lifting apparatus for mounting upon a portable base consisting of a dolly that is itself adapted to be independently used for demounting and remounting truck wheel assemblies from or onto their axles; such dolly being disclosed generally herein but more particularly in my pending patent application Serial No. 394,239 filed November 25, 1953. It is therefore an object of invention to provide a dual purpose and use therefor jointly as a portable lifting apparatus and as a dolly independently of the lifting apparatus.

Among other novel features of my invention are the following:

While the apparatus can lift comparatively high, it nevertheless has an extremely low collapsed height so that the apparatus may pass underneath comparatively low members and parts of a motor vehicle; the jack screw being so arranged that it still has lifting power to actuate the main frame and its supporting strut when the apparatus is folded into its lowest position.

The stability of the apparatus is enhanced by the inwardly rearwardly diverging arrangement of the arms of the strut and main frame as well as by the inwardly rearwardly diverging arrangements of the strut arms and a pair of link arms which together form a quadrupedal support for retaining the main or lifting frame in stabilized raised position.

The movable frame is of design to provide simplicity and rigidity in construction.

The work-supporting rack bars and their structural and mechanical operating instrumentalities are so arranged that the rack bars are maintained in horizontal positions during their raising and lowering movements; the rack bars being adjustable transversely of the apparatus as well as pivotally mounted to permit angular adjustments relatively to the longitudinal axis of the apparatus.

The rack bars are provided with a plurality of slots adapted to receive therein links of chains cooperating with suitable tightening screws whereby such chains are quickly adapted to embrace a transmission or differential case to securely fasten same to the rack bars.

The rack bars are adapted to be extended in length by suitable extension members when necessary for reaching over a cross member brace attached cross-wise to the truck frame.

The rack bar extension members are also particularly adapted to support, from their outer ends, novel hook means carrying pins adapted to be inserted into the bolt holes of the bell cover of a differential assembly whereby same may be conveniently removed from or mounted on the differential casing; such novel hooklike clamp permitting the exertion of a perpendicular pull on the bell cover and each being adapted to be used on either the right or left hand side of the bell cover and including a set screw for securely retaining the pin of the hook means within the bolt hole of the bell cover.

The various features of novelty whereby the present invention is characterized will hereinafter be pointed out with particularity in the claims, but, for a full understanding of the invention and of its objects and advantages, reference may be had to the following detailed description taken in connection with the accompanying drawings wherein:

Figs. 3 and 4 illustrate respectively side and end elevations of the work-supporting rack bars;

Figs. 5 and 6 illustrate respectively end and side elevations of extension arms for the work-supporting rack bars including novel clamp means adapted for supporting a bell cover of a differential casing from the extension arms;

Fig. 7 illustrates one of the adjustable supporting posts for one of work-supporting rack bars and is a cross-section on line 7—7 of Fig. 1;

Fig. 8 is a cross-section taken on line 8—8 of Fig. 7;

Fig. 9 is a longitudinal section taken on line 9—9 of Fig. 2 showing one form of manually operable means for raising and lowering the main frame and work-supporting rack bars carried thereon;

Fig. 10 is a cross-section taken on line 10—10 of Fig. 1 showing one of the hook-shaped retainers employed for quickly releaseably securing the lifting apparatus to the portable dolly;

Fig. 11 is a cross-section taken on line 11—11 of Fig. 10;

Fig. 12 is a cross-section taken on line 12—12 of Fig. 1;

Fig. 13 is a cross-section taken on line 13—13 of Fig. 2 showing the connection end of the tubular transverse base member of the lifting apparatus employed for connecting the latter to the portable dolly;

Fig. 14 is a cross-section through the end of the operating handle taken on line 14—14 of Fig. 1; and Fig. 15 is a cross-section taken on line 15—15 of Fig. 14.

Figure 1:
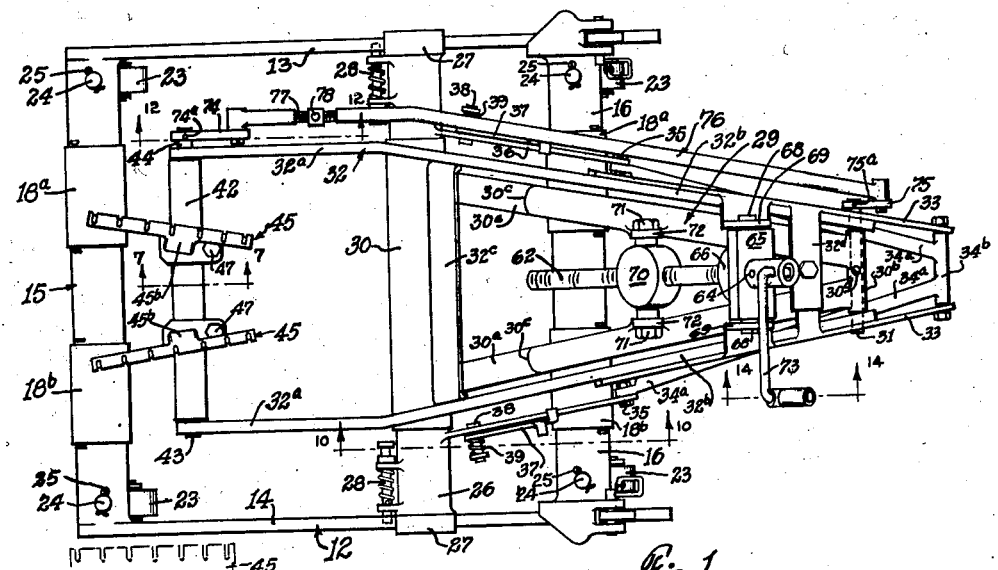
Fig. 1 is a plan view of lifting apparatus mounted on a portable dolly embodying a preferred form of my invention.

The dolly, or portable supporting base for the lifting apparatus, comprises a U-shaped frame generally designated by numeral 12 and consisting of a pair of laterally spaced parallel aligned side rails 13 and 14 rigidly connected together at corresponding ends by the stationary one of the wheel-lifting members 15.

A cooperating wheel-lifting member 16 is provided on the opposite ends of the rails 13 and 14 which is movably carried on the rails for adjustment relatively to the stationary wheel-lifting member 15.

The side rails 13 and 14 are preferably channel-shaped elongated members provided with a plurality of circular openings 17 in the webs thereof spaced longitudinally of the webs and functioning to lighten the weight of the dolly and also providing means for engagement therein of the end of a pinch bar employed for shifting the slidably movable wheel-lifting member 16 toward and from the stationary member 15.

Both of the wheel-lifting members 15 and 16 are each provided with a pair of cylindrical sleeve-like rollers 18$^a$ and 18$^b$ rotatably supported thereon in spaced apart positions on the medial portions thereof.

The frame of the dolly consisting of the members 13, 14, 15 and 16 is supported on caster wheels 23 carried on yoked spindles 24 that extend upwardly through the members 15 and 16 and are removably secured at their upper ends by cotter pins 25.

The lifting apparatus consists of a tubular support 26 having welded thereto at its ends inverted L-shaped hooks 27 that hook over the side rails 13 and 14 to retain the support 26 on the rails. At each end of the support 26 is a slidably mounted spring-pressed locking pin 28 the outer end of which is adapted to pass selectively into one of the holes 17 to thereby releaseably lock the support 26 against lateral and vertical displacement from its adjusted position on the rails 13 and 14.

A strut 29 is oscillatably mounted on the support 26 and consists of a tubular bearing 30 through which the tubular support 26 extends. Formed integrally with the bearing 30 or otherwise secured thereto as by welding, are a pair of strut arms 30$^a$ that extend outwardly in converging directions and terminate in a preferably integral tubular transverse portion 30$^b$.

Extending through and secured within the tubular portion 30$^b$ is a pivot pin 31 which constitutes a pivotal support for the cantilevered main frame generally designated by numeral 32 and consisting of transversely spaced parallel aligned rear arm portions 32$^a$ having outwardly extending integral portions 32$^b$, converging outwardly for embracement of the outer ends of the strut end portion 30$^b$ and for pivotal support on the outer ends of pivot pin 31; such pin 31 being non-rotatably secured within the tubular portion 30$^b$.

It will be noted that the major portion of the main frame 32 is cantilevered rearwardly from its pivotal support on pin 31 carried in the outer end of strut 29.

The outwardly converging portions 32$^b$ of the main frame are arranged to be disposed outwardly transversely of the strut arms 30$^a$ to permit the main frame to clear the outwardly conveying strut arms 30$^a$ when it is lowered into folded position with the strut disposed between the extensions 32$^b$ of the main frame.

The rear portions of the strut arms 30$^a$ are preferably bent angularly downwardly relatively to the outer portions thereof at the intermediate section 30$^c$ to clear the transverse member 16 when the main frame 32 is lowered to its lowermost folded position.

Figure 2:
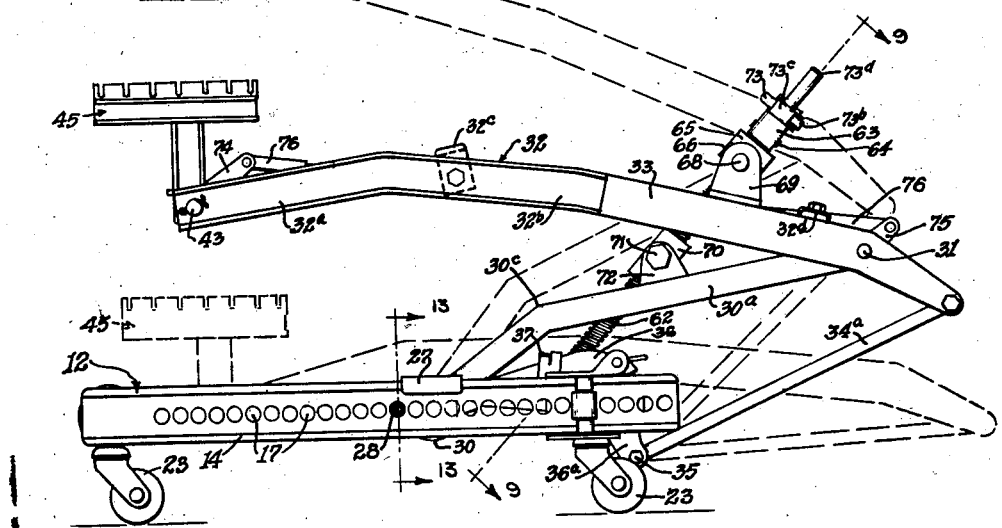
Fig. 2 is a side elevation of the apparatus shown in Fig. 1.

For the purpose of reenforcing the main frame extensions 32$^b$ and also for the purpose of extending the outer ends of the main frame, I preferably secure, in any suitable manner as by welding, to the edge of the flanges of both channel-shaped frame portions 32$^b$, reenforcing plates 33 which constitute the outer end portions of the main frame as more clearly shown in Figs. 1, 2 and 9.

The outer end portions 33 of the main frame are pivotally secured to a transverse tubular end 34$^b$ formed preferably integrally with a pair of outwardly converging link arms 34$^a$ having their inner ends pivotally secured, as at 35, to respectively a pair of hook-shaped retainers 36.

Each hook-shaped retainer 36 consists of an arcuate hook portion 36$^a$ which is respectively hooked over one of the sleeve-like rollers 18$^a$ or 18$^b$ on the tubular member 16 and each hook portion 36$^a$ has an integral extension 36$^b$ welded or otherwise secured at its inner end to the tubular support 26. To more securely interlock the lifter with the portable caster-supported base, each retainer 36 is provided with an L-shaped locking dog 37 pivotally mounted on pin 38 carried on the hook extension 36$^b$. A coiled spring 39 carried on pin 38 resiliently retains the dog 37 in face-engagement with the extension 36$^b$. Each dog 37 has securely mounted therein a short pin 40 that is adapted to pass beneath the lower edge of the extension 36$^b$ to thereby prevent the dog from accidental displacement from its locking position shown by the full lines in Fig. 10 in which position, with the dog in engagement with the sleeve-like roller, the retainer 36 lacks sufficient clearance to be displaced from its hooked engagement with the tubular member 16.

The end portion of the vertical arm of dog 37 is partially split to provide oppositely bent lips 37$^a$ and 37$^b$. The lip 37$^a$ functions, when the dog is in locking position, to prevent upward movement of the dog 37 by its interengaged position between this lip 37$^a$ and the pin 40. To release the retainer 37, to permit detachment of the lifting apparatus from the base, the lip 37$^b$ is engaged and moved outwardly to thereby slightly swing the dog outwardly against the pressure of spring 39 thereby disengaging the pin 40 from its engagement with the lower edge of the retainer 36 to permit the dog 37 to be swung upwardly into position to permit the retainer 36 to be disengaged from the tubular member 16, the dog being retained in raised position by the engagement of pin 40 with the top edge of the extension 36$^b$.

The side members 32$^b$ of the main frame are preferably reenforced by a pair of transverse bars 32$^c$ and 32$^d$.

At their free ends, the rear arm portions 32$^a$ of the cantilevered main frame carry a tubular transverse member 42, preferably of square cross-section, which is pivotally supported on suitable pivot pins 43 and 44 extending into the rear arm portions 32$^a$; each pivot pin being formed integrally with an enlarged head 42$^a$ suitably secured within the corresponding end of the member 42 as illustrated in Fig. 8.

Mounted upon the upper face of member 42 are two upstanding work-supporting rack bars 45 of similar construction but one having a right and the other a left hand rack. Each rack bar consists of a base 45$^a$ supporting a post 45$^b$ which carries at its upper end an elongated rack 45$^c$ having a plurality of longitudinally spaced vertical slots 45$^d$. The base 45$^a$ is extended on one side, as shown in Figs. 1 and 7, a distance corresponding to the length of an upper flat plate portion 46$^a$ of a generally U-shaped clamp 46 which embraces the tubular transverse member 42 and is adjustably secured to member 42 by a tightening bolt 47. By loosening the tightening bolt 47, the rack bars 45 may be adjustably spaced apart longitudinally of the transverse member 42 to suit the work to be handled by the lift, furthermore, since each rack bar is pivotally secured to the transverse member 42 by bolt 47, the rack bars also may be pivotally adjusted about the bolts 47 in relatively different angular positions in relation to the longitudinal axis of the lift.

The slotted rack bars are especially adapted for use of flexible work-supporting means such as link chains as shown clearly in Figs. 3 and 4 wherein such chains are illustrated supporting an automotive transmission case 50 shown in broken lines; two chains 48 extending between the slots 45$^d$ of the oppositely disposed racks support the bottom of the transmission case 50 while a hold-down chain 49 extends over the sides and top of the transmission case.

To secure the ends of the hold-down chain 49 to the racks 45$^c$ I provide adjustable securing means each comprising a U-shaped bracket 51 adapted to embrace the bottom edge of rack 45$^c$. Each bracket 51 has an integral extension 51$^a$ through which extends the threaded end of a screw 52 carrying a wing nut 53. Formed integrally with the upper end of screw 52 is a bifurcated hook 54. The end links of chain 49 are securely placed within the bifurcated ends of hooks 54 whereupon the hold-down chain 49 is securely tightened by rotation of the wing nuts 53.

Figs. 5 and 6 illustrate the use of extension arms 55 on the ends of the rack bars 45$^c$ for handling the bell cover of a differential assembly.

Each extension arm 55 consists of a pair of parallel transversely spaced bars 55$^a$ connected together at their opposite ends by transverse walls 55$^b$ and 55$^c$; the bars 55$^a$ carrying intermediate their ends a transverse pin 55$^d$ that is adapted to be seated in the outermost slot 45$^d$ when the arm 55 is mounted on the rack bar 45$^c$ and the upper edge of end wall 55$^b$ extending slightly above the top edges of the bars 55$^a$ and having therein a slot 55$^e$ adapted to receive a chain link. The bars 55$^a$ are formed with inner end portions 55$^f$ bent angularly downwardly to dispose the end wall 55ᶜ below the rack bar 45ᶜ so the securing screw 56 may engage the bottom of the rack bar 45ᶜ with its inner end when tightened to securely hold the arm 55 from displacement; the screw 56 also affording vertical adjustment of the outer end of the arm 55 if and when desired.

A portion of the rim of the bell cover plate 57 is shown by broken lines in Figs. 5 and 6.

Suspended by short link chains 58 from the outer ends of arms 55 are novel clamp means 59 that constitute connectors between the chains 58 and the bell cover plate 57. Each clamp means 59 constitutes a U-shaped clamp including as integral part thereof a cylindrical pin 59ᵃ spaced from a flat flange part 59ᵇ; the pin 59ᵃ being adapted to be inserted into one of the bolt holes 57ᵃ whereupon screw 60 may then be tightened against the edge of the plate 57 to thus secure the clamp to the plate 57. A wire loop 61 having its ends secured to opposite sides of the flange 59ᵇ conveniently connects the U-shaped clamp to an end link of the chain 58. Either end of the symmetrically shaped loop 61 may be connected to the chain 58 as illustrated by the two clamps shown in Fig. 5.

I have preferred to show a screw-operated jack mechanism for raising and lowering the main frame 32 and its operatively associated work-supporting rack bars 45, however, it is obvious that a manually operable hydraulic jack mechanism could readily be substituted for the screw-operated jack mechanism by interposing same between the main frame 32 and the strut members 30ᵃ for varying the angle between the frame 32 and the strut; the frame 32 being caused to be raised when the angle is increased and lowered when such angle is decreased.

The screw-operated jack mechanism is illustrated in Figs. 1, 2 and 9 of the drawings and comprises an elongated threaded screw 62 having an integral cylindrical shank 62ᵃ at its upper end and a collar 62ᵇ secured, as by pin 62ᶜ, between the shank and the threaded screw portion.

A tubular sleeve 63 is secured to the outer end of shank 62ᵃ as by pin 64 and adjacent the inner end of sleeve 63 is a spacer plate 65. Between the collar 62ᵇ and the spacer plate 65 is a combined trunnion and bearing holder consisting of a cylindrical ring 66 embracing within it the inner and outer races of a ball-bearing 67; the shank 62ᵃ extends through the inner race which has one side in face engagement with the collar 62ᵇ and the outer race has one side in face engagement with the spacer plate 65.

Extending outwardly from opposite sides of the ring 66 is a pair of longitudinally aligned trunnions 68 having outer ends pivotally supported in ears 69 secured in any suitable manner to the upper faces of the main frame extensions 32ᵇ.

The screw 62 has threaded engagement within a disk-like nut 70 which is pivotally carried on a pair of oppositely disposed screws 71 that are rotatably supported in a pair of ears 72 welded or otherwise secured to the strut arms 30ᵃ.

The screw 62 is manually rotatable by a suitable crank 73 that has its inner end 73ᵃ bent angularly and securely connected with sleeve 63; the outer end of crank 73 is bent angularly, as at 73ᵇ, for mounting thereon of a sleeve 73ᶜ carrying a handle 73ᵈ as more clearly shown in Figs. 1, 14 and 15.

As will appear from Figs. 1, 2 and 9, a rotation of screw 62 in one direction by crank 73 will cause the screw to move upwardly thereby increasing the distance between the centers of the trunnions 68 and the pivotally mounted screws 71; such upward movement of the screw reacting through its trunnions 68 and ears 69 to cause the main frame and strut to move correspondingly upward while the main frame maintains its pivotal connections with the strut 29 and link arms 34ᵃ thus progressively raising the work-supporting racks 45 to a desired height. A reverse rotation of screw 62 will accordingly cause a lowering of the main frame and of its working-supporting racks.

It must be understood that although pin 31 is rigidly secured by pin 30ᵈ against rotation relatively to the tubular end 30ᵇ of the strut 29, its ends, however, do rotate slightly relatively to the frame sides 34ᵃ when the frame 32 is raised or lowered.

To maintain the outer ends 33 of the main frame movable in a large arc, I provide the links 34ᵃ which constitute the radii of such arc while the pin 31 of the strut 29 functions as the fulcrum of the main frame 32; the links 34ᵃ being so arranged relatively to their pivotal connections with the base 12 and frame 32 and relatively to the pivot pin 31 of strut 29 that, in its upward and downward movements, the frame 32 maintains a substantially horizontal position responsively to the rotations of screw 62, however, to maintain the racks 45 in horizontal positions during the raising and lowering of the frame 32, I provide supplemental means therefor.

The transverse frame member 42 is pivotally supported between the frame sides 32ᵃ, and the work-supporting racks 45, together with member 42, are adapted to be maintained in horizontal positions during the vertical movements of the frame by supplemental means consisting of a lever arm 74 rigidly secured to the end of pin 44, as by a transverse pin 74ᵃ, and a second lever arm 75 secured to a corresponding end of pin 31, as by a transverse pin 75ᵃ; the free ends of arms 74 and 75 being pivotally connected together by an elongated link 76 whose longitudinal axis is parallel to a longitudinal axis of the frame 32 intersecting the centers of pivot pins 44 and 31.

With the arms 74 and 75 parallel to each other and connected by link 76 whose longitudinal axis is parallel to the longitudinal axis of the frame disposed between the pivot pins 44 and 31, and with the pin 44 rigidly connected to the rack-supporting transverse member 42, and the arms 74 and 75 secured respectively to pin 44 and pin 31 and their relative lengths properly proportioned so that said axes are parallel, the racks 45 will be maintained in horizontal positions during the raising and lowering of the frame 32.

For purposes of precisely adjusting the length of the longitudinal axis of the link 76 and for conveniently variably adjusting the vertical tilt of the rack bars 45 in the event it is desirable to tilt the work supported on the bars during removal from or installation into a vehicle, the link 76 may be provided with adjustable means for lengthening or shortening the link by removing a short section from the link and connecting the adjacent ends of the link by an adjustable screw 77 having reversedly threaded ends extending into threaded engagement with the spaced adjacent ends of the link; the screw 77 having rigidly secured thereto, intermediate its ends, a head 77ᵃ that is channeled to carry a slidable rod 78 for manually operating the screw.

From the above specification and accompanying drawings it will be readily apparent that the invention disclosed herein is characterized by the following distinctively novel features:

The novel adaptation of the lifting apparatus for use on a portable base comprising a dolly that is independently adaptable for handling motor vehicle wheel assemblies enhances the scope of usefulness of the dolly and provides motor vehicle service operators with a dual purpose tool.

The novel hook-shaped retainers for the lifting apparatus that are pivotally mounted on the tubular support that is carried on the dolly constitute quickly applicable means for securely interlocking the lifting apparatus with the dolly.

The lifting apparatus is characterized by simplicity which renders same comparatively low in cost production.

Although the work-supporting rack bars may be lifted to a very desirable height above the portable base, as a result of the novel organization and relative arrangement of the cantilevered frame, its supporting strut, and mechanism for varying the angularity between the cantilevered frame and the strut, the design of the lifting apparatus is such that it has an extremely low collapsed height which renders it very adaptable to work under a low chassis of a motor vehicle or under a motor vehicle that has been hoisted to a comparatively high elevation.

The work-supporting rack bars are adapted to carry an automotive transmission or differential casing suspended therefrom on flexible chains which render the lifting apparatus more flexibly and quickly and securely adaptable to such particular automotive service.

The center of gravity of the load carried on the work-supporting rack bars is supported directly above and well within the area of the portable base between spaced pairs of caster wheels so that the entire apparatus is at all times stabilized against tipping or tilting about its supporting base; the stability of the apparatus being augmented by the inwardly rearwardly diverging arrangement of the arms of the strut and main frame and by the inwardly diverging arrangements of the strut and link arms which together form a quadrupedal support for retaining the main frame in stabilized raised position.

The extension arms of the work-supporting rack bars together with the novel clamp means provide conveniently adaptable means for handling the bell covers of a differential assembly.

I claim:

1. The combination with a portable base comprising a pair of laterally shaped side rails rigidly connected together at corresponding ends by a transverse relatively stationary member and a transverse member movably mounted on said rails in laterally spaced relation from and parallel to said stationary member, of lifting apparatus including a transverse support carried on said rails between and parallel to said stationary and movable members, a strut having its inner end pivotally secured to said transverse support, a vertically movable work-supporting frame pivotally cantilevered upon the outer end of said strut, work-supporting means carried on the inner free end of said frame, means for releaseably interlocking said transverse support with said movable member, a pair of links pivotally secured at their inner ends to said interlocking means and at the opposite outer ends thereof pivotally secured to the outer ends of said frame at points spaced outwardly beyond the pivotal support of said frame on the outer end of said strut, and manually operable means interposed between said frame and said strut for raising and lowering said frame by varying the angularity between said main frame and said strut.

2. In lifting apparatus, a portable base frame comprising a pair of laterally spaced parallel side rails rigidly connected together at corresponding ends by a relatively stationary transverse member, a second transverse member carried on said rails and movably adjustable relatively to said stationary member, a third transverse member carried on said rails disposed between and parallel to said stationary and movable members, a strut pivotally supported at its inner end on said third transverse member, a vertically movable main frame pivotally supported on the outer end of said strut, said main frame having a rearwardly extending cantilevered portion, means for releaseably interlocking the ends of said third transverse member with said side rails, means for releaseably interlocking said third transverse member with said second movable member, work-supporting means carried on the cantilevered inner end portion of said main frame, unitary link means pivotally secured at one end to said interlocking means and at the opposite end thereof pivotally secured to the outer end of said main frame at points spaced outwardly beyond the pivotal support of said main frame on the outer end of said strut, and a manually operable screw for raising and lowering said main frame rotatably supported at its outer end on trunnioned means carried on said main frame and including trunnioned means carried on said strut having threaded engagement with a medial portion of said screw.

3. In lifting apparatus as set forth in claim 2 wherein said second and third transverse members are cylindrical in cross-section, and wherein said interlocking means comprises a pair of hook-shaped retainers, each retainer consisting of an arcuate hook portion, adapted to be hooked over said second movable member, having an integral extension rigidly secured to said third transverse member, a locking dog pivotally mounted on said extension adapted to be positioned with its free end against said second movable member to thereby prevent accidental detachment of said arcuate portion from said second movable member, and means adapted to maintain said dog in raised unlocked position or in lowered locked position comprising a pin carried on said dog normally projecting into the plane of said extension adapted, upon transverse movement of said dog about its pivot, to rest upon the upper edge of said extension to thereby maintain said dog in unlocked position, said dog being retained in locked position when said pin rests against the lower edge of said extension, and resilient means carried on the pivotal support for said dog normally retaining said dog in face engagement with said extension with said pin resting on the upper edge or against the lower edge of said extension.

4. Lifting apparatus comprising a portable base frame, a vertically movable cantilevered main frame, a strut having an outer transverse end pivotally secured to said main frame, a transverse support on said base frame pivotally carrying the inner end of said strut, work-supporting means carried on the free inner end of said cantilevered main frame, means for releasably interlocking said transverse support with said base frame, link means pivotally secured at laterally spaced inner ends thereof to said interlocking means and at the opposite outer end thereof pivotally secured to the outer ends of said main frame at points spaced outwardly longitudinally beyond the pivotal support of said main frame on the outer end of said strut, and manually operable means interposed between said main frame and said strut for raising and lowering said main frame by varying the angularity between said main frame and said strut.

5. Lifting apparatus as set forth in claim 4 and including a transversely disposed rack bar support having pivotal elements projecting from and rigidly secured in the opposite ends thereof for pivotally carrying said rack bar support on the inner end of said main frame, said work-supporting means comprising a pair of elongated rack bars, each rack bar having a plurality of vertical slots in the upper edge thereof spaced longitudinally thereof, a vertical post supporting each rack bar, a base for each post having an extension on one side thereof, a U-shaped clamp below each base and said extension embracing said rack bar support, and a tightening bolt extending through each base extension and through the open ends of each U-shaped clamp adapted upon tightening to securely fasten the rack bars to said pivotally carried rack bar support, said U-shaped clamps being slidably adjustable on said rack bar support to selectively vary the lateral spacing between the rack bars, and said rack bars also being pivotally adjustable about the clamp-tightening bolts into variable angular positions relatively to the longitudinal axis of the apparatus.

6. Lifting apparatus as set forth in claim 5 and including an extension arm detachably mounted on each rack bar, each extension arm comprising a pair of parallel transversely spaced bars connected together at their opposite ends by upper and lower transverse walls, a transverse pin extending between said bars intermediate the ends of the arm adapted to be seated in one of said slots when the arm is mounted on one of said rack bars, a screw having threaded connection in the lower one of said transverse walls adapted to adjustably vary the angularity of the portion of the arm that projects beyond the rack bar, the upper one of said transverse walls having a vertical slot therein adapted to receive a link of a comparatively short connection chain, said connection chain being connected at its free end with a wire loop, a U-shaped clamp carried by said wire loop comprising a flat flange as one of the arms of the U and a cylindrical pin as the other arm of the U, said cylindrical pin being adapted to be inserted in a bolt hole of a bell cover plate of a differential assembly, and a set screw carried in said flange adapted to be tightly secured against the peripheral edge of said cover to thereby securely suspend the bell cover plate from the end of the extension arm.

7. Lifting apparatus as set forth in claim 5 including securing means for supporting the work on the work-supporting rack bars comprising at least one link chain extending between said pair of rack bars and underneath the work and having one link near each end of the chain seated in one of the slots of an adjacent rack bar.

8. Lifting apparatus as set forth in claim 5 including a U-shaped bracket embracing the bottom edge of each rack bar, an adjustable chain-tightening hook having a threaded stem carried by each bracket, a hold-down chain extending between said hooks over the top of the work and having one link near each end of the chain engaged with the adjacent one of the chain-tightening hooks, and a nut on each threaded stem adapted to tighten the hold-down chain to securely retain the work on the rack bars.

9. Lifting apparatus as set forth in claim 5 wherein said main frame consists of a pair of elongated members having parallelly aligned inner arm portions provided with outwardly extending integral portions converging outwardly for pivotal embracement of the outer pivotal end of said strut, and wherein said strut consists of a pair of arms rigidly connected at their inner ends with a tubular bearing carried on said transverse support, said strut arms extending outwardly in relatively converging directions and being integrally connected with the outer transverse pivotal end of said strut and said strut arms being disposed within a lateral plane bounded by said outwardly converging arm portions of said main frame.

10. Lifting apparatus as set forth in claim 5 including means for maintaining said work-supporting rack bars in horizontal positions during the raising and lowering of said main frame comprising a lever arm rigidly secured to a pivotal element in one end of said rack bar support, a second lever arm rigidly secured to one end of the pivotal support for the main frame on the outer end of said strut, and a link connecting the free ends of said arms.

11. In lifting apparatus as set forth in claim 10 wherein said link connecting said arms is manually adjustable in length to permit said rack bars to be tilted in a vertical plane.

12. Lifting apparatus comprising a portable wheel-supported base frame, a strut pivotally mounted at its rear inner end on said base frame adapted to extend forwardly with its front outer end above said base frame, a main frame pivotally mounted on the front outer end of said strut and having a rearwardly extending major portion cantilevered from its pivotal support on said strut, manually actuable power means interposed between said main frame and said strut for varying the angularity between said main frame and said strut to thereby cause said main frame to swing up or down about its pivotal support on said strut, work-supporting rack bars pivotally carried on the free rear end of said main frame, means for maintaining said rack bars substantially horizontal during the swinging movements of said main frame, and link means for maintaining the movements of the outer terminal end of said main frame in a predetermined path.

13. Lifting apparatus as set forth in claim 12 wherein said strut includes a pair of forwardly outwardly converging arms pivotally supported at their rear ends on said base frame and terminating at their front outer ends in the pivotal support for said main frame, and wherein said main frame includes a pair of forwardly outwardly converging arm portions disposed outwardly transversely of said outwardly converging strut arms to thereby clear the strut arms during the raising and lowering movements of said main frame.

14. Lifting apparatus as set forth in claim 13 wherein said link means includes a pair of arms extending outwardly in relatively converging directions, pivotally secured at their inner ends to said base frame and at their outer ends pivotally secured to said main frame, said strut and link arms forming together a quadrupedal support for retaining said main frame in stabilized raised position.

References Cited in the file of this patent

UNITED STATES PATENTS

| | | |
|---|---|---|
| 1,276,210 | Hamelback | Aug. 20, 1918 |
| 1,956,797 | Jackson et al. | May 1, 1934 |
| 2,377,477 | Bloch | June 5, 1945 |
| 2,583,114 | Monteith | Jan. 22, 1952 |
| 2,631,009 | Jordan | Mar. 10, 1953 |